Nov. 5, 1929.  H. B. MEREDITH  1,734,390
CHICK FOUNTAIN
Filed Sept. 27, 1927   2 Sheets-Sheet 1

Witness
C. J. Dykstra

Inventor
Harry B. Meredith
by Bair & Freeman Attorneys

Nov. 5, 1929.  H. B. MEREDITH  1,734,390
CHICK FOUNTAIN
Filed Sept. 27, 1927  2 Sheets-Sheet 2
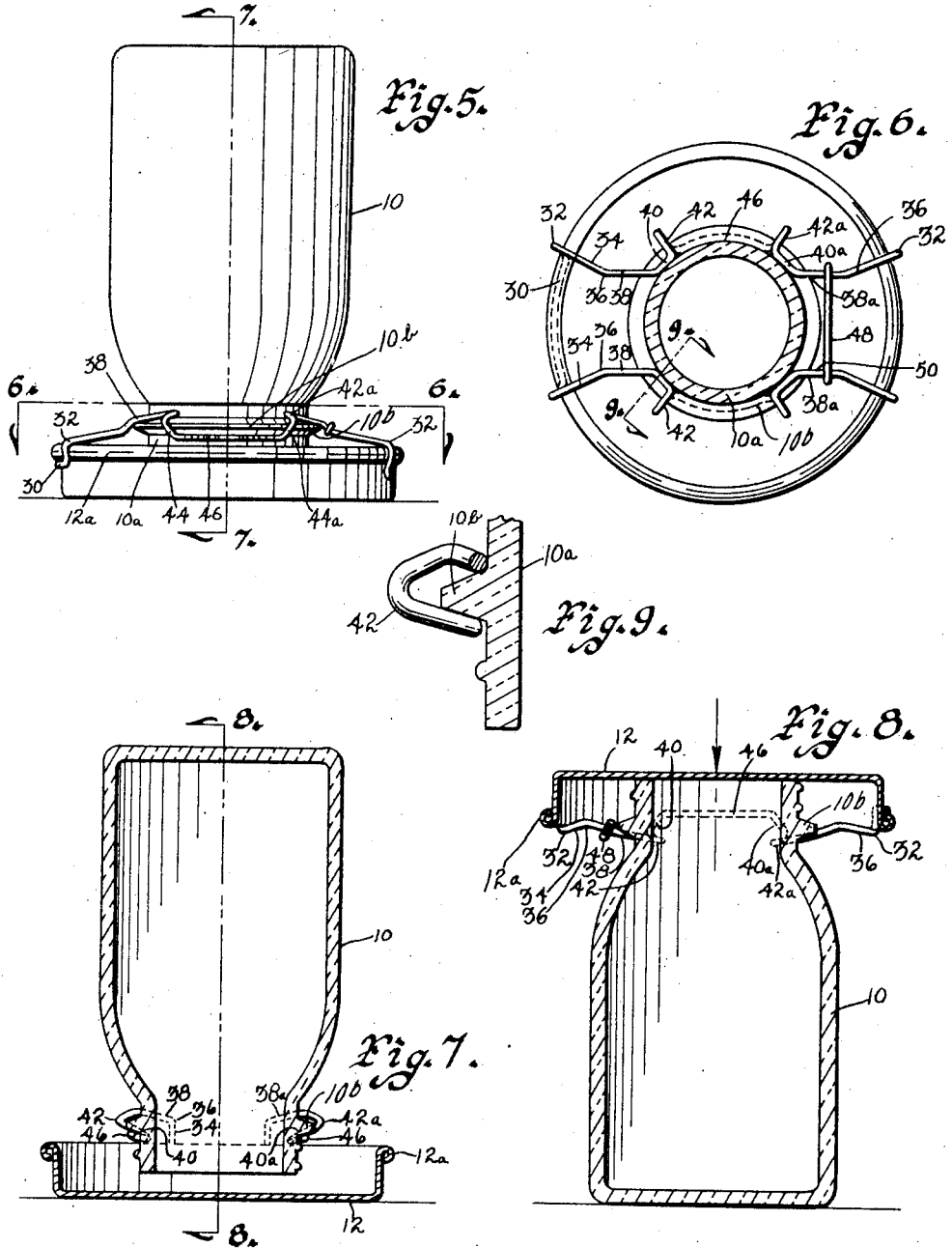

Patented Nov. 5, 1929

1,734,390

UNITED STATES PATENT OFFICE

HARRY B. MEREDITH, OF DES MOINES, IOWA

CHICK FOUNTAIN

Application filed September 27, 1927. Serial No. 222,310.

My present invention has to do with a chick fountain of simple, durable, and inexpensive construction.

More particularly it is my object to provide a supporting means whereby a glass jar may be mounted in inverted position on a pan or other container with its mouth below the upper edge of the container which supporting means is so constructed and arranged that the jar of water or feed holder may be pressed toward the bottom of the pan and when the pressure is released will automatically return to its normal position.

Still a further object is to provide such a supporting means of novel structure and of very simple and inexpensive construction.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 5 shows a side elevation of another form of my invention.

Figure 6 is a horizontal sectional view taken on the line 6—6 of Figure 5.

Figure 7 is a vertical sectional view taken on the line 7—7 of Figure 5.

Figure 8 is a vertical sectional view of the device in inverted form with the pan pressed against the reservoir; and Figure 9 is a sectional view taken on the line 9—9 of Figure 6.

Heretofore it has been a common practice to make a chick fountain by providing a lower drinking container which for convenience I shall call a pan. This pan may be made of metal, glass, earthen ware or any material adapted for the purpose. A water container in the form of a Mason fruit jar or any other form that will serve as a suitable reservoir is supported on the pan by a suitable means with its mouth below the level of the top of the pan. Various kinds of supporting devices have been employed.

My present invention relates particularly to a new form of supporting device for chick fountains of this kind. I shall first describe the form of device shown in Figures 1 to 4.

Figure 2:
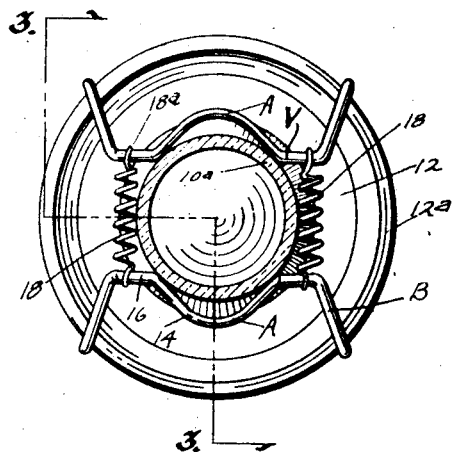
Figure 2 is a horizontal sectional view taken on the line 2—2 of Figure 1.
Figure 3:
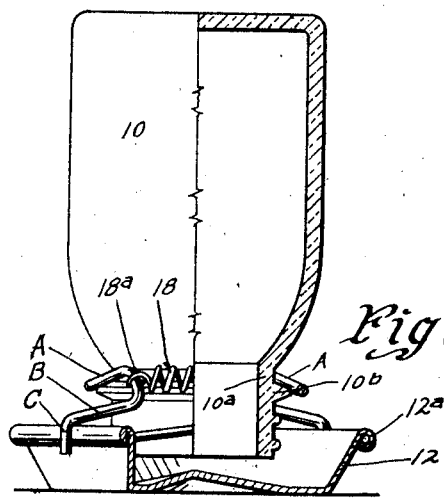
Figure 3 is a detail vertical sectional view taken on the line 3—3 of Figure 2.

In the drawing herewith I have used the reference numeral 10 to indicate generally the reservoir which may have the form of an ordinary fruit jar with the rib $10^b$ on the contracted threaded neck $10^a$. For coacting with the reservoir jar 10 I provide a lower container 12 which may be made of metal or glass or otherwise and is in the shape of a comparatively shallow pan with a peripheral external bead $12^a$ at its upper edge. It is my purpose to provide a simple, cheap and convenient means for supporting the reservoir 10 in inverted position above the pan 12 with the neck of the jar projecting a short distance into the pan. My supporting device includes a pair of members which, perhaps, for convenience, might be called brackets. I will describe these brackets as though they stood in substantially horizontal position. Each bracket comprises a central cross member A having the horizontal arms B projecting away from the member A and terminating in a downwardly extending hook portion C. The central member A of each bracket is bent so that as viewed from above its central portion as at 14 is curved on the arc of a circle smaller than that of the neck $10^a$. The central portion 14 terminates in laterally projecting portions 16. The portion A as viewed in side elevation (see Figure 1) is inclined from its central part slightly upwardly and laterally to the ends of the curved part 14 and then downwardly and laterally. Thus the portions 16 are inclined from the portion A downwardly and laterally as shown. These brackets are used in pairs and are connected by two coil springs 18 having loops $18^a$ at their ends which receive the outer ends of the portions 16 as shown in Figure 2. The springs 18 tend to draw the brackets toward each other and are so located that when the neck of the inverted jar 10 is pushed between the portions A of the two brackets and between the two spaced springs 18, the central parts of the springs may be slightly bowed outwardly and are substantially tensioned. The tension of the springs is sufficient to hold the jar 10 in upright inverted position with its mouth projecting into the pan 12 as illustrated in Figure 3. A supporting device of this kind has a number of important advantages. It does not cause any restriction of the mouth of the jar. This is important in feeding certain kinds of feeds and in feeding butter milk and clabbered milk, which have some tendency to clog the neck of the jar, which tendency, of course, is increased by anything extending across, below or within the neck.

Another feature of my present device which is of real importance is found in the structure whereby it is possible to press the jar and pan together toward each other until the jar mouth rests against the bottom of the pan. In preparing a chick fountain of this kind for use, the jar is placed right side up and the water or feed is put into the jar. The supporting device is installed on the jar neck and the pan connected therewith in inverted position. The pan 12 is then pressed tightly against the jar mouth and the entire fountain may then be turned over and then when the pressure is released, the jar will rise to its position shown in Figures 1 and 3. The user thus avoids spilling the contents of the jar.

Figure 4:
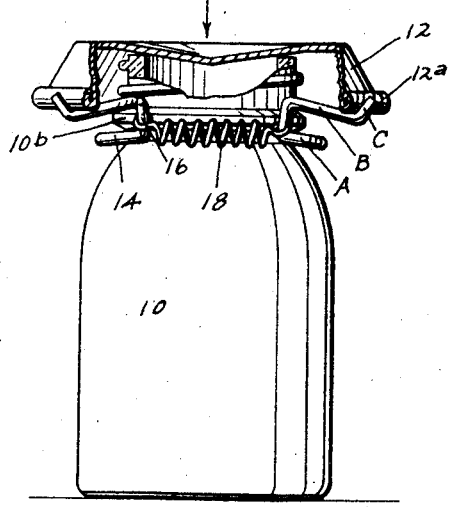
Figure 4 is a side elevation of the chick fountain in inverted position with the pan pressed against the mouth of the jar.

I have found considerable difficulty in providing a device which permits the jar and pan to be pressed together as shown in Figure 4. I find that the desirable result can be obtained by giving to the portion A the form hereinbefore described.

Figure 1:
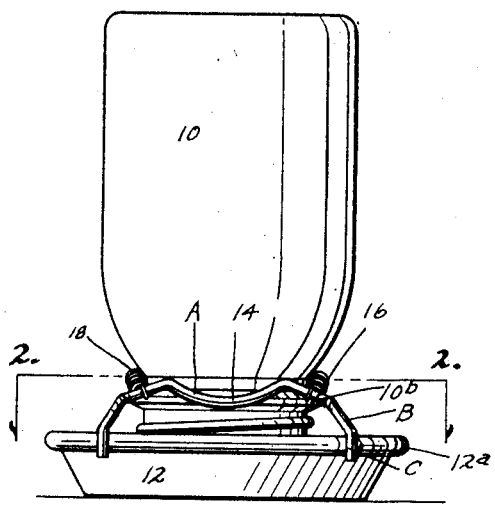
Figure 1 is a side elevation of a chick fountain embodying my invention.

I find that when the parts have been installed and have assumed the relative positions shown in Figures 1 and 3, then when the pan is pressed tightly against the jar mouth, the brackets rock on the V points formed at the junctions between the portion 14 and the portions 16. The hook members C form pivots over the rib $12^a$. When this rocking movement occurs, the arms B incline inwardly from the edge and also toward the bottom of the pan 12. The portions 16 move from the position shown in Figure 1 to the position shown in Figure 4 where they incline from the points where they contact with the jar neck in directions which increase the tension of the springs 18.

When the pressure on the jar and pan by which they are held together is released, the tension of the springs 18 tends to restore the parts to their normal position with the mouth of the jar substantially spaced from the bottom of the pan. Thus when the parts are in normal position, the apex of the V formed by the members 14 and 16 is up and the arms of the V extend downwardly from the apex. When the pan and jar are pressed together as shown in Figure 4, the apex of the V is still up but the arms incline downwardly and also toward the pan wall for thus stretching the springs and putting them under the tension which will lift the jar and return it to its normal position when the device is inverted and pressure by which the jar and pan are held together is released.

Any shape may be given to the brackets which will afford the proper lever and fulcrum action necessary for tending to hold the jar normally in raised position, while permitting the pan and jar neck to be sprung together.

In Figures 5 to 9 inclusive, I have shown another form in which my improved chick fountain may be embodied. I have shown here in this form the same reservoir 10 having the contracted neck $10^a$ with the annular rib $10^b$. I have shown also the same pan 12 with the peripheral rib $12^a$.

My improved support of the type shown in Figures 5 to 9 comprises a member made of a piece of resilient wire. This wire is bent to form a curved portion 30 adapted to fit the outside of the pan just below the rib $12^a$ as shown in Figures 5 and 6.

The ends of the portions 30 are curved outwardly, then upwardly and then inwardly to form substantially U-shaped portions 32 to receive the rib $12^a$. The upper arms of the U-shaped portions 32 are inclined on converging lines toward each other at 34 to points about midway between the top of the pan 12 and the neck $10^a$ of the reservoir 10 as indicated at 36.

From the points 36 these arms are inclined slightly away from each other as at 38. At the inner ends of the portions 38 are short portions 40 inclined away from each other and adapted to fit against the neck of the reservoir.

It may be said that the portions 38 and 40 are also inclined upwardly somewhat as shown in Figure 5. From the portions 40, portions 42 extend radially away from the neck $10^a$. From the outer ends of the portions 42, portions 44 are inclined inwardly and downwardly. The portions 42 and 44 are designed to receive the rib $10^b$.

Extending around the neck $10^a$ from the portions 44 on opposite sides of the neck are portions 46 from which extend portions $44^a$ and $42^a$ similar to the portions 44 and 42. Extending from the portions $42^a$, are portions $40^a$ similar to the portions 40. From the portions $40^a$ extend portions $38^a$, $36^a$ and $32$ similar to those already described.

The members $38^a$ are held against spreading by any suitable means, such for example as the wire member 48 having at its ends hook members 50 receiving said portions $38^a$.

The members 32 are slipped over the rib 12ª as shown in Figure 5 and the neck of the container is then inserted with the portions 46 resting beneath the annular rib 10ᵇ and the portions 40 and 40ª, resting above the rib.

On account of the upward inclination of the members 38 and 38ª, the reservoir 10 is normally held with its mouth above the bottom of the pan (see Figures 5 and 10). However, the pan 12 may be pressed against the mouth of the reservoir 10 as shown in Figure 8 by springing the parts so that the operations of filling the reservoir, holding the pan against the mouth thereof until the reservoir was inverted, then allowing the reservoir to rise away from the pan, are the same as has already been described with reference to the device shown in Figures 1 to 4.

It will be noted that in both forms of the device, the wires are shaped to secure a lever and fulcrum action such that when the parts are under tension, the fountain is in normal operative position.

It will be understood that the jar or reservoir 10 may be made of glass or other suitable material and the pan 12 may be made of glass or other suitable material, and that the construction and arrangement and material of the parts of the supporting member may be varied somewhat without departing from the real spirit and purpose of my invention, and it is my intention to cover by my claims any modified forms of structure or use of mechanical equivalents, which may be reasonably included within their scope.

I claim as my invention:

1. In a fountain of the character disclosed, a pan, an inverted jar having an open mouth and supporting means for holding said jar in position above said pan with said mouth normally spaced above the bottom and below the top of said pan, said supporting means being arranged to allow said mouth to be forced into contact with said bottom and comprising spaced elements, each having a pair of arms having ends pivotally engaging the rim of said pan and connecting member with portions pivotally engaging the jar above the mouth thereof, means for connecting such elements for holding such portions in jar gripping position, said supporting means having resiliency constraining said elements to move said jar toward normal position.

2. In a fountain of the kind described, a shallow receptacle, an inverted reservoir with a reduced neck, and supporting means for holding the reservoir above the receptacle, including a pair of elements each comprising a central connecting member having portions at its ends engaging the reservoir neck, and having arms extending angularly from such portions terminating in parts engaged over the edge of the receptacle, means for connecting said elements for holding such portions against the neck, said supporting means having resiliency for nomally holding the reservoir with its open end above the bottom and below the top of the receptacle and for permitting the reservoir to be yieldingly forced to position engaging the bottom of the receptacle.

3. In a fountain of the class described, a shallow receptacle, an inverted reservoir with a reduced neck, and supporting means for holding the reservoir above the receptacle with the mouth thereof above the bottom and below the top of the receptacle and for permitting such mouth to be yieldingly pressed against the bottom of the receptacle against the tension of the supporting means, such supporting means comprising a pair of spaced elements, each having a central connecting member curved on the arc of a smaller circle than that of the neck of the reservoir so as to cause two spaced end portions of such member to engage the neck of the reservoir, each of such elements having arms projecting angularly from such ends and terminating in portions adapted to engage over the edge of the receptacle, compression springs connecting the respective elements with each other on opposite sides of such neck substantially at the junctions between such members and such arms.

HARRY B. MEREDITH.